(12) United States Patent
Liou et al.

(10) Patent No.: US 7,369,155 B2
(45) Date of Patent: May 6, 2008

(54) APPARATUS AND METHOD FOR REJECTING CO-CHANNEL INTERFERENCE SIGNAL

(75) Inventors: Ming-Luen Liou, Zhonghe (TW); Chiao-Chih Chang, Taipei (TW)

(73) Assignee: Mediatek Incorporation, Hsin-Chu (TW)

( * ) Notice: Subject to any disclaimer, the term of this patent is extended or adjusted under 35 U.S.C. 154(b) by 541 days.

(21) Appl. No.: 11/130,069

(22) Filed: May 16, 2005

(65) Prior Publication Data

US 2006/0256190 A1 Nov. 16, 2006

(51) Int. Cl.
*H04N 5/38* (2006.01)

(52) U.S. Cl. ............................ 348/21; 348/607; 348/725

(58) Field of Classification Search .................. 348/21, 348/723–726, 607, 614, 625, 620–622, 470; 375/346, 348, 350, 321, 324, 232–233; *H04N 5/38, H04N 5/21*
See application file for complete search history.

(56) References Cited

U.S. PATENT DOCUMENTS

| 5,572,262 | A | 11/1996 | Ghosh | 348/607 |
|---|---|---|---|---|
| 5,574,496 | A | 11/1996 | Nielsen et al. | 348/21 |
| 5,594,496 | A | 1/1997 | Nielsen et al. | 348/21 |
| 5,793,417 | A | 8/1998 | Lee | 348/21 |
| 5,798,803 | A | 8/1998 | Limberg | 348/726 |
| 5,801,759 | A | 9/1998 | Limberg | 348/21 |
| 5,801,790 | A | 9/1998 | Limberg | 348/607 |
| 5,821,988 | A | 10/1998 | Citta et al. | 348/21 |
| 5,835,131 | A | 11/1998 | Limberg | 348/21 |
| 5,923,378 | A | 7/1999 | Limberg | 348/555 |
| 6,023,306 | A | 2/2000 | Limberg | 348/726 |
| 6,052,158 | A | 4/2000 | Nielsen | 348/725 |
| 6,057,877 | A | 5/2000 | Limberg | 348/21 |
| 6,133,942 | A | 10/2000 | Lee | 348/21 |
| 6,177,951 | B1 | 1/2001 | Ghosh | 348/21 |
| 6,219,088 | B1 | 4/2001 | Liu et al. | 348/21 |
| 6,226,049 | B1 * | 5/2001 | Oh | 348/607 |
| 6,229,560 | B1 | 5/2001 | Jun | 348/21 |
| 6,269,133 | B1 | 7/2001 | Lee | 375/350 |
| 6,344,871 | B1 | 2/2002 | Liu et al. | 348/21 |
| 6,380,969 | B1 | 4/2002 | Limberg | 348/21 |
| 6,384,858 | B1 | 5/2002 | Limberg | 348/21 |
| 6,388,701 | B1 * | 5/2002 | Lee | 348/21 |

(Continued)

OTHER PUBLICATIONS

"Co-Channel Interference Cancellation for HDTV Receivers" Ghosh; 1999; pp. 2675-2678.

*Primary Examiner*—Trang U. Tran
(74) *Attorney, Agent, or Firm*—Thomas, Kayden, Horstemeyer & Risley (57) ABSTRACT

Methods and television receivers for rejecting a co-channel interference signal from a first digital signal. A first digital signal is delayed to output a first delayed signal. In this method, an synthesized interference signal is generated based on the first digital signal. The synthesized interference signal is subtracted from the first delayed digital signal and produces a second digital signal. The second digital signal is equalized to output an equalized signal based on a first decision signal. The equalized signal is decoded to output the first decision signal. The equalized signal is delayed to output a second delayed signal. A compensation signal is generated based on the first decision signal. The compensation signal is subtracted from the delayed second signal and produces a fifth digital signal serving as an output signal.

20 Claims, 7 Drawing Sheets

U.S. PATENT DOCUMENTS

| | | | |
|---|---|---|---|
| 6,400,393 B1 | 6/2002 | Limberg | 348/21 |
| 6,421,077 B1 | 7/2002 | Reed, Jr. | 348/21 |
| 6,441,843 B1 | 8/2002 | Limberg | 348/21 |
| 6,456,316 B1 | 9/2002 | Jun | 348/21 |
| 6,480,233 B1 | 11/2002 | Limberg | 348/470 |
| 6,633,325 B1 * | 10/2003 | Lee | 348/21 |
| 6,697,098 B1 * | 2/2004 | Wang | 348/21 |
| 2002/0039151 A1 | 4/2002 | Liu et al. | 348/607 |

* cited by examiner

APPARATUS AND METHOD FOR REJECTING CO-CHANNEL INTERFERENCE SIGNAL

BACKGROUND

The invention relates to television signal transmission systems and methods, and more particularly, to methods and systems for eliminating the effects of NTSC analog television signal interference components on digital advance television (DATV) signals when both are simultaneously transmitted in the same frequency band.

Recent years have witnessed the establishment of a standard for transmission of high definition television (HDTV) signals, over both cable and terrestrial broadcast modes, throughout the United States. Although it offers significantly enhanced picture resolution, terrestrial broadcast of HDTV signals is somewhat problematic due to the almost universally installed base of conventional NTSC broadcast and more particularly, reception equipment. The present system provides for simultaneous transmission (simultaneous broadcast) of HDTV signals and conventional NTSC analog television signals in order to provide high definition television services without rendering the installed base of NTSC receivers obsolete. Conceptually, program material is encoded into the two different formats (NTSC and HDTV) and simultaneously broadcast over respectively 6 MHz transmission channels. Viewers having conventional NTSC equipment would be able of receiving and viewing NTSC programming by tuning in the appropriate NTSC channel, while viewers equipped with HDTV equipment would be able to receive an HDTV program by tuning their receiver to the appropriate HDTV channel. While conceptually simple, simultaneous broadcast of NTSC and HDTV signals often results in characteristic portions of an NTSC signal interfering with adjacent channel or co-channel HDTV signals causing degradation to the HDTV signal.

The cause of this form of signal degradation is well understood by those familiar with high definition television transmission systems and is conventionally termed NTSC co-channel interference. Various means have been proposed in the art to reduce NTSC co-channel interference in current HDTV transmission methodologies, and particularly with respect to vestigial sideband (VSB) HDTV transmissions, which form the basis of the HDTV standard in the United States. Certain of these conventional NTSC interference rejection means are summarized in ATSC standard A/53 (1995) ATSC Digital Television standard. Briefly, the interference rejection properties of a conventional HDTV system are based on the frequency location of the principal components of the NTSC co-channel interference signal within the 6 MHz television channel.

Figure 1:
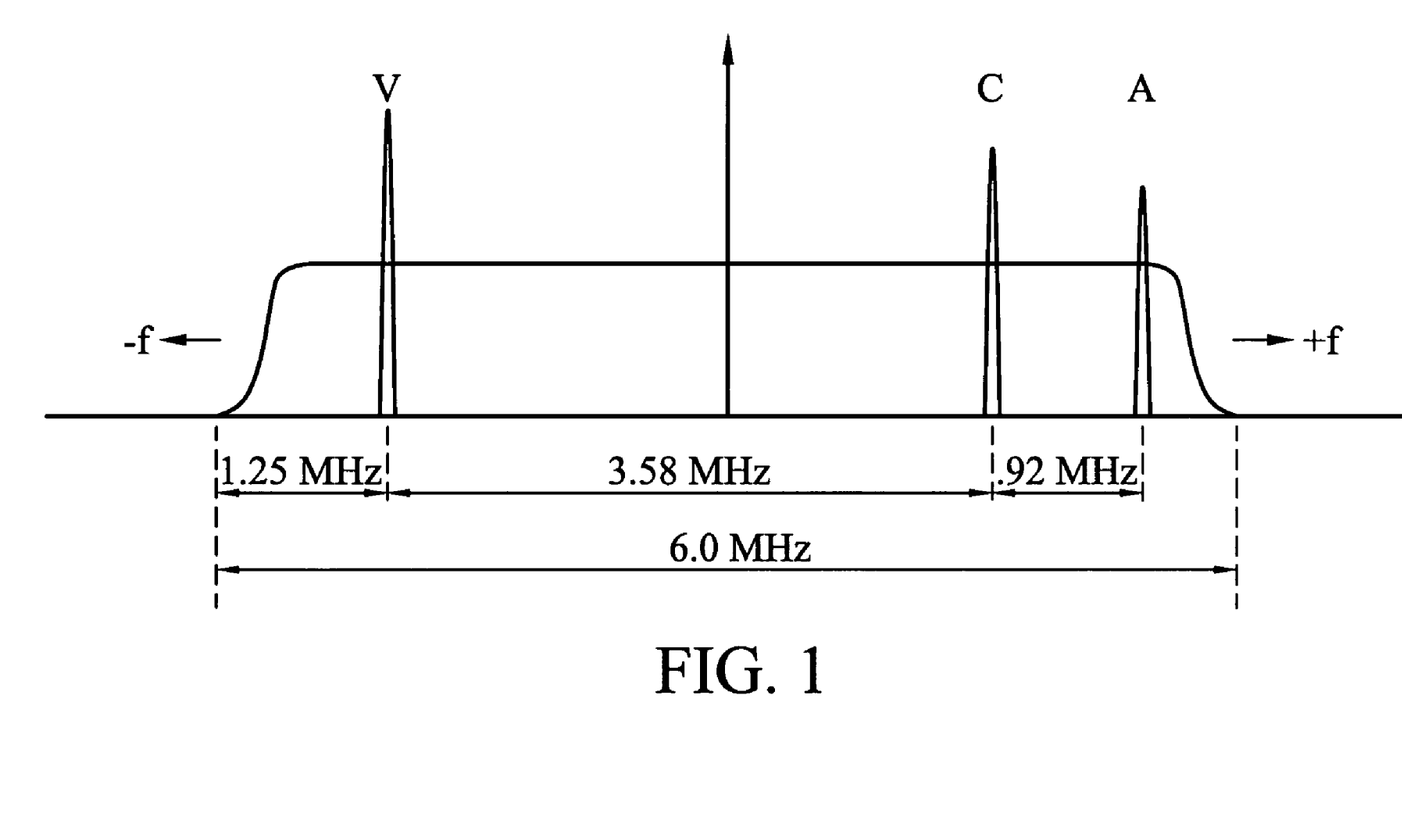
FIG. 1 depicts a typical 6 MHz DTV channel spectrum.

FIG. 1 depicts a typical 6 MHz DTV channel spectrum, represented in baseband in the frequency domain (i.e., symmetric about DC). NTSC co-channel interference is generally recognized as being caused by the three principal carrier components of an NTSC signal; the video carrier, color carrier, and the audio carrier. In the illustrative channel spectrum diagram of FIG. 1, the location and approximate magnitudes of the three principal NTSC components are depicted with the video carrier, indicated at V, located approximately 1.25 MHz from the lower channel bard edge. The color carrier, indicated at C, located approximately 3.58 MHz from above the video carrier frequency, and the audio carrier A is located approximately 4.25 MHz above the video carrier frequency. As depicted in the Figure, and is as well understood in the art, NTSC carrier component interference is of particular concern due to the relatively large amplitudes of the video carrier V and color subcarrier C which characterize NTSC transmission. Although the audio carrier A is presented at a relatively smaller amplitude, it nevertheless contributes a significant interference characteristic. Thus, it will be understood that NTSC co-channel interference rejection is an important consideration in the design of HDTV channels in order to ensure the enhanced quality of an HDTV signal.

Figure 2A:
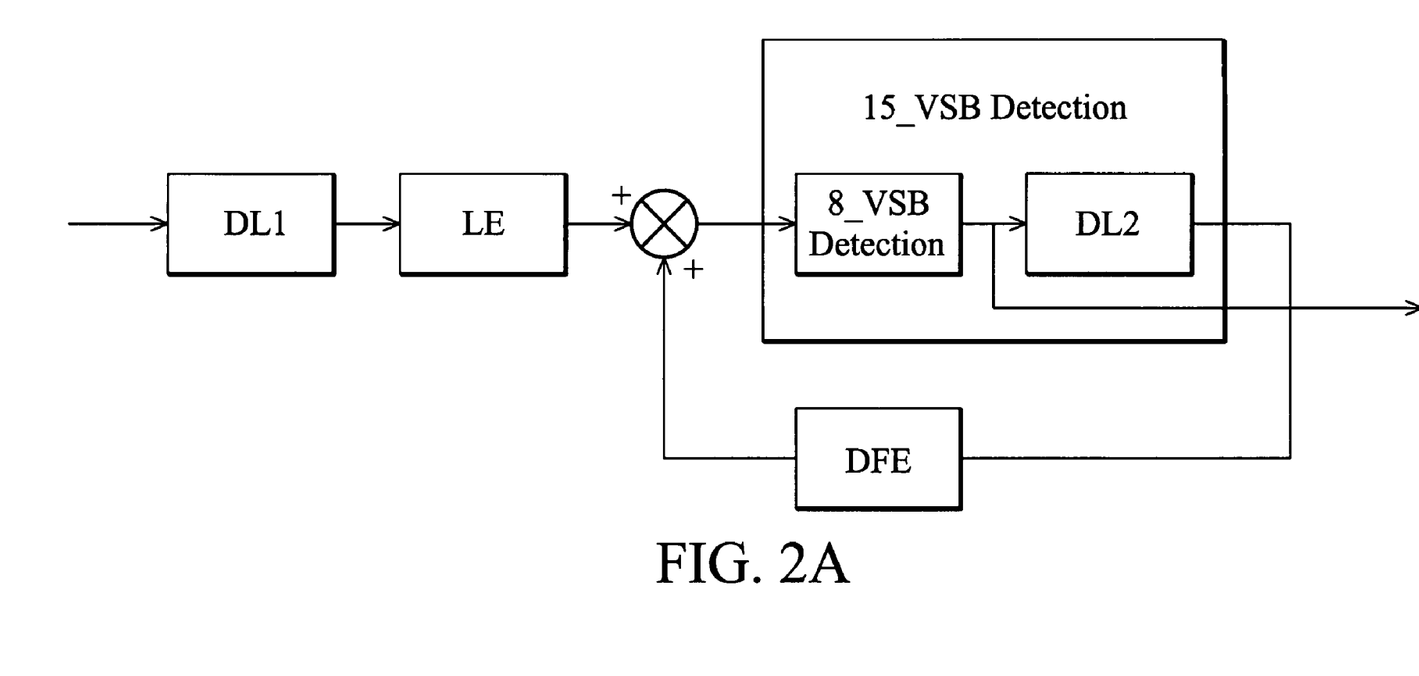
FIG. 2A shows a conventional comb filter for NOSC co-channel interference rejection.
Figure 2B:
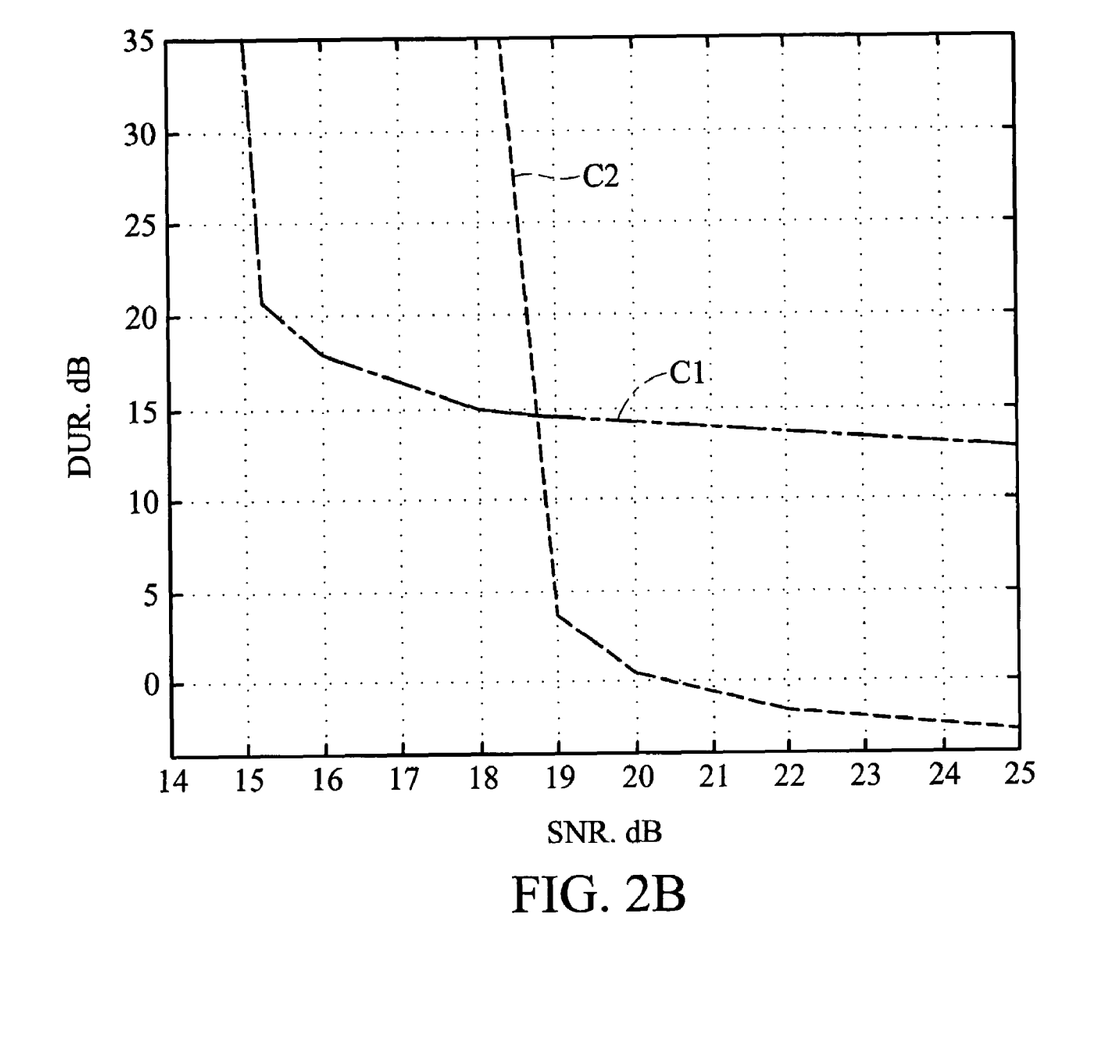
FIG. 2B shows the relationship between signal to noise ratio (SNR) and desired to undesired ratio (DUR) of a DTV receiver with conventional comb filter shown in FIG. 2A.

Conventional approaches to NOSC co-channel interference rejection are based on the frequency location of the principal components of the NTSC co-channel interference signal within the 6 MHz HDTC channel. FIG. 2A shows a conventional comb filter for NOSC co-channel interference rejection. It, however, has complex circuitry and degrades 3 dB of signal noise rate (SNR). Further, a detector is required to detect NTSC co-channel interference and decide whether to enable/disable NOSC co-channel interference rejection. If NOSC co-channel interference is very small or does not exist the delay lines DL1 and DL2 are bypassed to avoid degradation to the HDTV signal, and thus, its hardware cost is increased. FIG. 2B shows the relationship between signal to noise ratio (SNR) and desired to undesired ratio (DUR) of a digital television receiver with conventional comb filter shown in FIG. 2A. Curve C1 shows the relationship between SNR and DUR when the comb filter in the DTV receiver is disabled. Curve C2 shows the relationship between SNR and DUR when the comb filter in the DTV receiver is enabled. Typically, the comb filter must be disabled when NOSC co-channel interference is very small or not exist, thereby avoiding degradation to the HDTV signal.

SUMMARY

Embodiments of a method for rejecting a co-channel interference signal from a first digital signal, in which the first digital signal is delayed by M taps to output a first delayed signal, wherein M is a positive integer. A synthesized interference signal is generated by feeding the first digital signal to a synthesis filter. For example, the synthesis filter can be a N-tap FIR filter or a (2M+1)-tap symmetric FIR filter, which N>M. The synthesized interference signal is subtracted from the first delayed digital signal to produce a second digital signal. The second digital signal is equalized to output an equalized signal based on a first decision signal. The equalized signal is decoded to output the first decision signal. The equalized signal is delayed by M taps to output a second delayed signal. A compensation signal is generated based on the first decision signal. The compensation signal is subtracted from the second delayed signal to produce a fifth digital signal serving as an output signal.

Also disclosed are embodiments of a receiver capable of rejecting a co-channel interference signal from a digital signal. The receiver comprises an interference rejection unit, an equalization unit, a first decision unit and a compensation unit. The interference rejection unit receives the first digital signal and outputs a second digital signal. In the interference rejection unit, a first delay unit with M taps delays the first digital signal and generates a first delayed signal. A synthesis filter generates a synthesized interference signal based on the first digital signal and a first subtracting unit subtracts the synthesized interference signal from the first delayed signal and outputs the second digital signal. The equalization unit receives the second digital signal, a first decision signal and outputs an equalized signal. In the equalization unit, a first equalizer receives the second digital signal and generates a third digital signal, a second equalizer receives the first and second decision signals and generates a fourth digital signal, and an adder sums the third and fourth digital signals and outputs the equalized signal. The first decision unit receives the equalized signal and generates the first decision signal. The compensation unit receives the equalized signal and the first decision signal and outputs an output signal. In the compensation unit, a second delay unit with M taps delays the equalized signal and generates a second delayed signal. A compensation filter generates a compensation signal based on the first decision signal, and a second subtracting unit subtracts the compensation signal from the second delayed signal and outputs a fifth digital signal serving as the output signal. Preferably, the receiver further comprises a second decision unit generates the second decision signal based on the fifth digital signal, and the equalization unit generates the equalized signal based on the second digital signal, the first decision signal and the second decision signal.

DESCRIPTION OF THE DRAWINGS

The invention can be more fully understood by the subsequent detailed description and examples with reference made to the accompanying drawings, wherein.

DETAILED DESCRIPTION

First Embodiment

Figure 3:
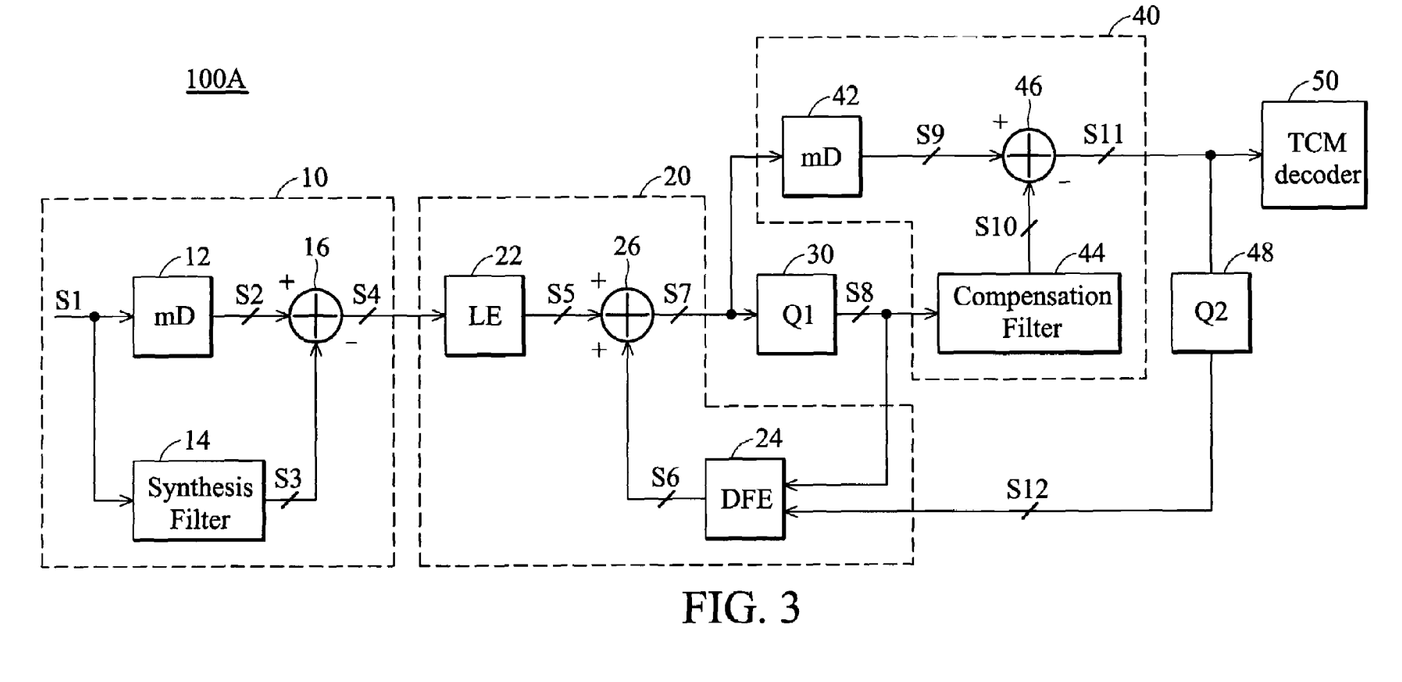
FIG. 3 is a first embodiment of a digital television receiver.

FIG. 3 is a first embodiment of a digital television receiver capable of rejecting a co-channel interference signal from a received digital signal. Specifically, digital television receiver 100A includes a 2-stage detection scheme for rejecting a co-channel interference signal from a received digital signal.

As shown in FIG. 3, the digital television receiver 100A comprises an interference rejection unit 10, an equalization unit 20, a first decision unit 30, and a compensation unit 40.

The interference rejection unit 10 receives the first digital signal S1 and outputs a second digital signal S4, in which the digital signal can be a digital television signal and the co-channel interference signal can be a NTSC signal. For example, the first digital signal S1 received by the interference rejection unit 10 can comprise a plurality of symbols, noise and the co-channel interference signal.

The interference rejection unit 10 comprises a first delay unit 12, a synthesis filter 14 and a first subtracting unit 16. In this embodiment, the first delay unit 12 can be a delay line with M taps (stages) to delay the first digital signal S1 and generate a first delayed signal S2, in which M is a positive integer. The synthesis filter 14, for example, can be a (2M+1)-tap symmetric finite impulse response (FIR) filter, receives the first digital signal S1 and generates a synthesized interference signal S3 based on the received first digital signal S1. In this embodiment, the synthesis filter 14 is a (2M+1)-tap symmetric finite impulse response (FIR) filter, but is not limited thereto. The synthesis filter 14 can also be a N-tap finite impulse response (FIR) filter, in which N>M. The first subtracting unit 16 is coupled to the first delay unit 12 and the synthesis filter 14, subtracting the synthesized interference signal S3 from the first delayed signal S2 and outputting the second digital signal S4.

The equalization unit 20 is coupled to the interference rejection unit 10 to receive the second digital signal S4, a first decision signal S8, and preferably a second decision signal S12 and output an equalized signal S7 accordingly. The equalization unit 20 comprises a first equalizer 22, a second equalizer 24 and an adder 26.

The first equalizer 22 coupled to the first subtracting unit 16, receives the second digital signal S4 and generates a third digital signal S5. The first equalizer 22 can be a linear equalizer to equalize the second digital signal S4 output from the first subtracting unit 16 and generate the third digital signal S5.

The second equalizer 24 receives the first decision signal S8 from the first decision unit 30 and the second decision signal S12 from the second decision unit 48 and generates a fourth digital signal S6. Note that, it is preferred that the second equalizer 24 generates the fourth digital signal S6 based on both the first decision signal S8 and the second decision signal S12. Alternatively, the second equalizer 24 can generate the fourth digital signal S6 merely based on the first decision signal S8. However, in such a case the performance will be downgraded. For example, the second equalizer 24 can be a decision feedback equalizer, in which the coefficients of the second equalizer 24 are initialized based on the coefficients of the synthesis filter 14.

The adder 26 is coupled to the first equalizer 22 and the second equalizer 24, to add the third and fourth digital signals S5 and S6 and output the equalized signal S7.

The first decision unit 30 is coupled between the equalization unit 20 and the compensation unit 40 to receive the equalized signal S7 and generate the first decision signal S8. In this embodiment, the first decision unit 30 can be a decoder such as a slicer.

The compensation unit 40 is coupled to the equalization unit 20 and the first decision unit 30 to receive the equalized signal S7 and the first decision signal S8 and output an output signal accordingly. The compensation unit 40 comprises a second delay unit 42, a compensation filter 44, and a second subtracting unit 46.

The second delay unit 42, for example, a delay line with M taps, delays the equalized signal S7 and generates a second delayed signal S9.

The compensation filter 44 is coupled to the first decision unit to generate a compensation signal S10 based on the first decision signal S8. The coefficients of the compensation filter 44 are set according to the coefficients of the synthesis filter 14.

The second subtracting unit 46 is coupled to the second delay unit 42 and the compensation filter 44 to subtract the compensation signal S10 from the second delayed signal S9 and output a fifth digital signal S11 serving as the output signal to an error detection unit 50 such as a trellis coded modulator (TCM) decoder.

A second decision unit 48 is coupled to the second subtracting unit 46 to generate the second decision signal S12 base on the fifth digital signal S11. For example, the second decision unit 48 can also be a slicer, and the equalization unit 20, the first decision unit 30, the compensation unit 40, and the second decision unit 48 can constitute a 8-VSB equalizer.

In some embodiments, the synthesis filter 14 can also be a (N+M+1)-tap symmetric FIR filter to generate a synthesized interference signal S3 based on the received first digital signal S1. If so, the first and second delay units 12 and 42 are each a delay line with N taps respectively.

Second Embodiment

Figure 4:
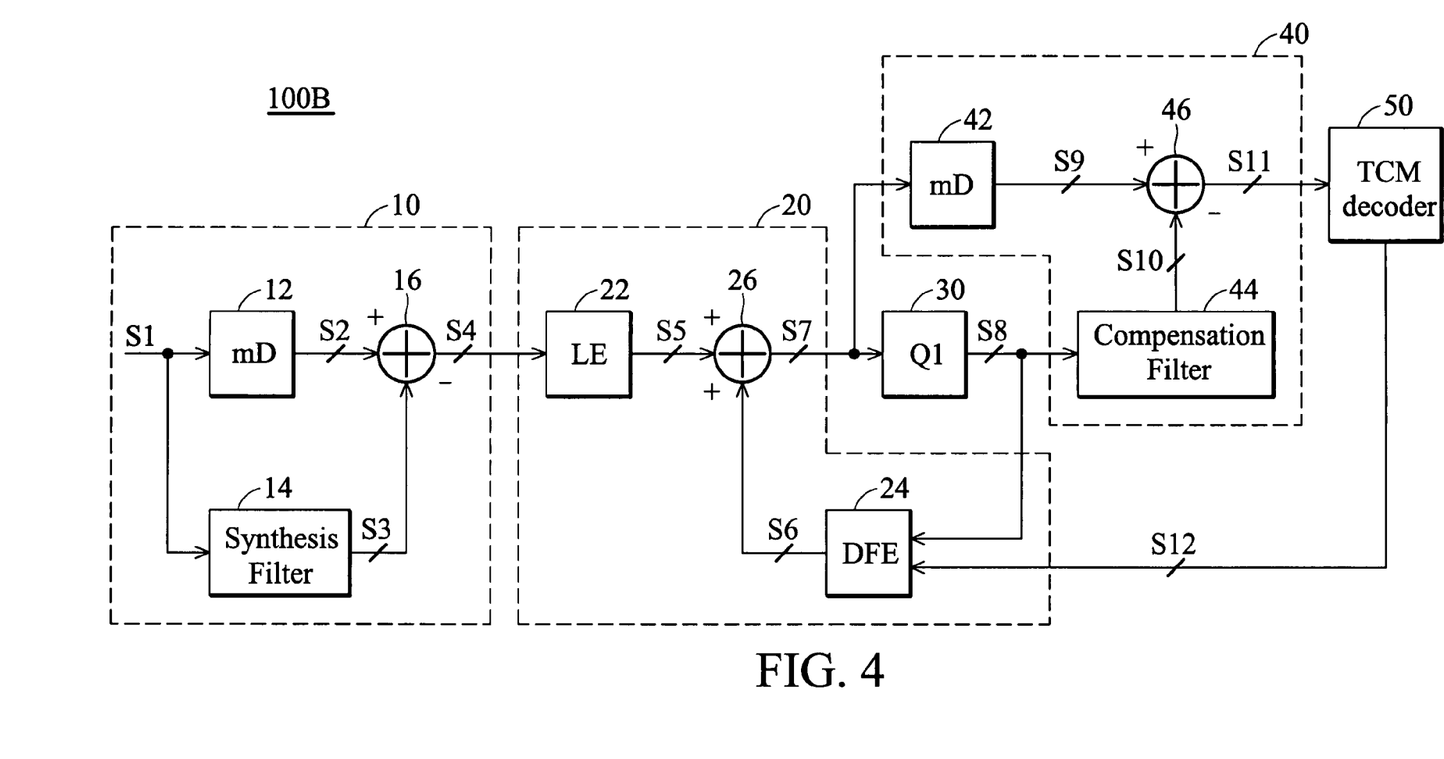
FIG. 4 is a second embodiment of a digital television receiver.

FIG. 4 is a second embodiment of a digital television receiver capable of rejecting a co-channel interference signal from a received digital signal. The digital television receiver 100B shown in FIG. 4 is similar to the television receiver 100A in the FIG. 3, except that the second decision unit is an error correction decoder such as a trellis coded modulator (TCM) 50 decoder rather than a slicer. The TCM decoder 50 generates the second decision signal S12 according to the fifth digital signal S11 from the second subtracting unit 46. Operations of the digital television receiver 100B shown in FIG. 4 are similar to those shown in FIG. 3, and thus, are omitted for simplification.

Figure 5:
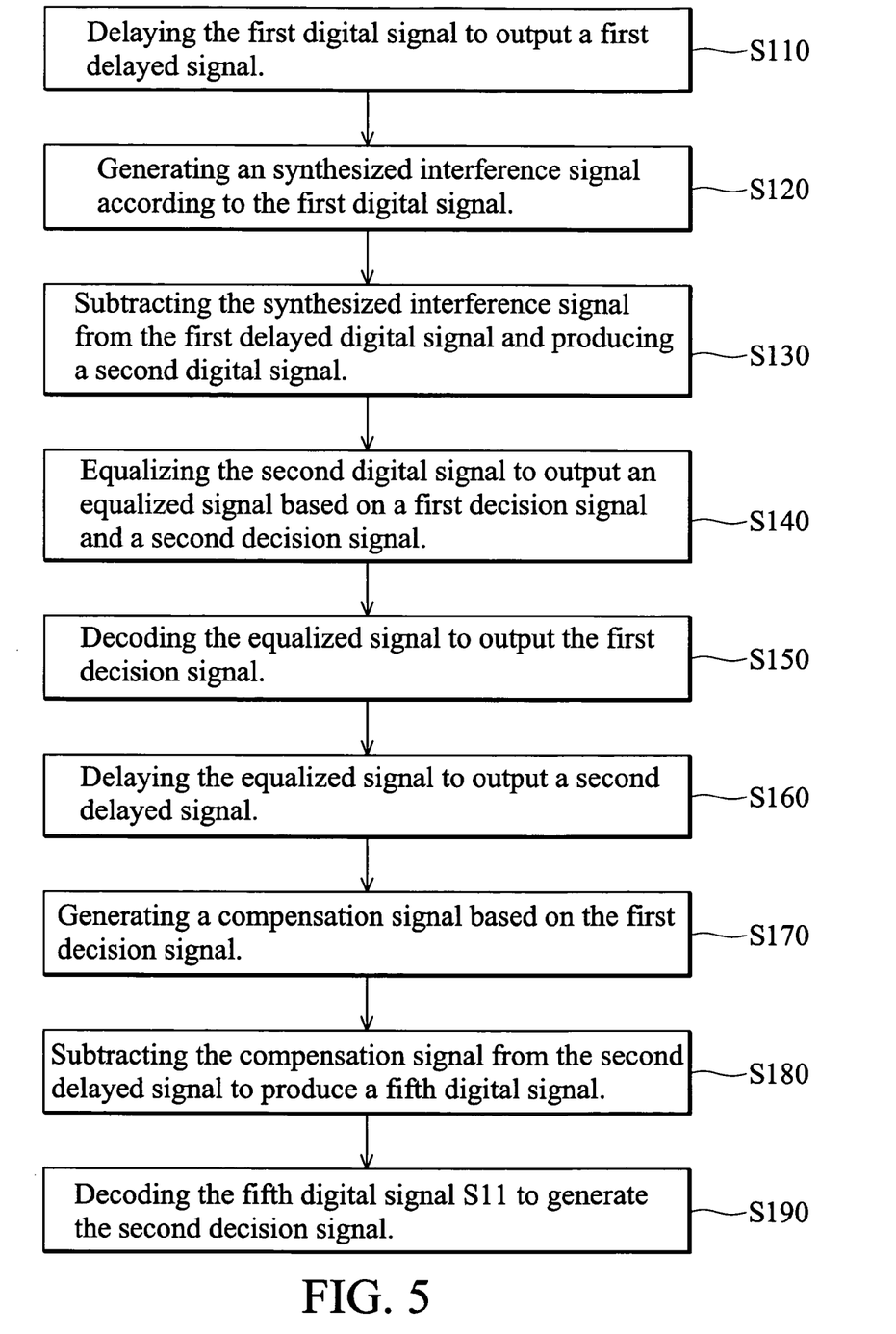
FIG. 5 is a flowchart showing an embodiment of a method for rejecting a co-channel interference signal from a digital signal.

FIG. 5 is a flowchart showing an embodiment of a method for rejecting co-channel interference signal from a first digital signal in a digital television receiver.

In step S110, a first digital signal S1 is delayed by a delay element such as a delay line with M taps to output a first delayed signal S2.

In step S120, a synthesized interference signal S3 is generated according to the first digital signal S1 by feeding the first digital signal S1 to the synthesis filter 14. For example, the synthesis filter 14 can be a N-tap FIR filter with N>M. Preferably, the synthesis filter 14 is a (2M+1)-tap symmetric FIR filter.

In step S130, the synthesized interference signal S3 is subtracted from the first delayed signal S2 by the first subtracting unit 16, and a second digital signal S4 is then output to the equalization unit 20.

In step S140, the second digital signal S4 is equalized according to a first decision signal S8 and a second decision signal S12, and an third digital signal S5 is output to the adder 26. In detail, a third digital signal S5 is generated by feeding the second digital signal S4 to the first equalizer 22. A fourth digital signal S6 is generated by feeding the first decision signal S8 and the second decision signal S12 to the second equalizer 24. The equalized signal S7 is obtained by adding the third digital signal S5 and the fourth digital signal S6 using the adder 26. Note that, it is preferred that the second equalizer 24 generates the fourth digital signal S6 based on both the first decision signal S8 and the second decision signal S12 in step S140. Alternatively, in step S140, the second equalizer 24 can generate the fourth digital signal S6 merely based on the first decision signal S8. However, in such a case the performance will be downgraded.

In step S150, the equalized signal S5 is decoding to a first decision signal S8 by a first decision unit 30, the first decision signal S8 is then output to the second equalizater 24.

In step S160, the equalized signal S5 is delayed by the second delay unit 42, such as a delay line with M taps, and a second delayed signal S9 is output to the second subtracting unit 46.

In step S170, a compensation signal is generated by a compensation filter 44 according to the first decision signal S8.

In step S180, the compensation signal S10 is subtracted from the delayed second digital signal by a second subtracting unit 46, and a fifth digital signal S11, serving as an output signal, is produced.

In the step S190, the fifth digital signal S11 is decoded to generate the second decision signal S12 by a second decision unit, such as a slicer or an error correction decoder.

Figure 6:
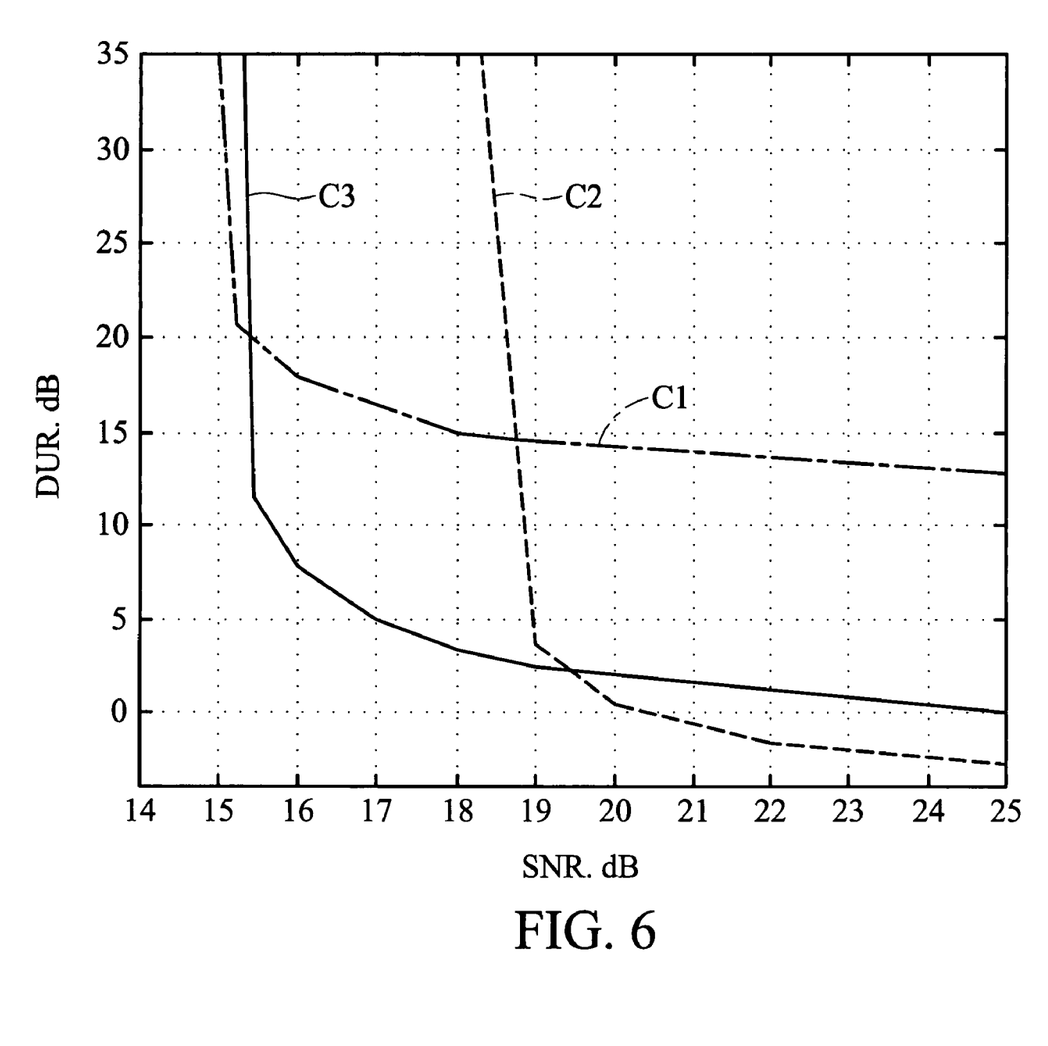
FIG. 6 shows the relationship between signal to noise ratio (SNR) and desired to undesired ratio (DUR) of the DTV receiver of the invention.

FIG. 6 shows the relationship between signal to noise ratio (SNR) and desired to undesired ratio (DUR) of the DTV receiver of the invention. Curve C1 shows the relationship between SNR and DUR when the comb filter in the conventional DTV receiver as shown in FIG. 2A is disabled. Curve C2 shows the relationship between SNR and DUR when the comb filter in the conventional DTV receiver is enabled. Curve C3 shows the relationship between SNR and DUR of the DTV receiver with a NTST rejection unit. As shown in FIG. 6, the DTV receiver can have a NTST rejection performance close to that of the conventional comb filter without degradation to the HDTV signal by disabling the comb filter when NOSC co-channel interference is very small or does not exist.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of rejecting co-channel interference signal from a first digital signal, comprising:
    delaying the first digital signal by M taps to output a first delayed signal, wherein M is a positive integer;
    generating an synthesized interference signal by feeding the first digital signal to a synthesis filter, wherein the synthesis filter is a N-tap FIR filter with N>M;
    subtracting the synthesized interference signal from the first delayed digital signal and producing a second digital signal;
    equalizing the second digital signal to output an equalized signal based on a first decision signal;
    decoding the equalized signal and outputting the first decision signal;
    delaying the equalized signal by M taps and outputting a second delayed signal;
    generating a compensation signal based on the first decision signal; and
    subtracting the compensation signal from the second delayed signal and producing a fifth digital signal serving as an output signal.

2. The method as claimed in claim 1, wherein decoding the equalized signal comprises slicing the equalized signal to output the first decision signal.

3. The method as claimed in claim 1, wherein the synthesis filter is a N-tap symmetric FIR filter with N=2M+1.

4. The method as claimed in claim 1, wherein the compensation signal is generated by feeding the first decision signal to a compensation filter comprising coefficients set based on the coefficients of the synthesis filter.

5. The method as claimed in claim 1, wherein the step of equalizing the second digital signal to output the equalized signal comprises:
    generating a third digital signal by feeding the second digital signal to a first equalizer;
    generating a fourth digital signal by feeding the first decision signal to a second equalizer; and adding the third digital signal and the fourth digital signal to obtain the equalized signal.

6. The method as claimed in claim 1, further comprising decoding the fifth digital signal to generate a second decision signal, wherein the step of equalizing the second digital signal further bases on the second decision signal.

7. The method as claimed in claim 6, wherein the second decision signal is generated by a slicer.

8. The method as claimed in claim 6, wherein the second decision signal is generated by an error correction decoder.

9. The method as claimed in claim 6, wherein equalizing the second digital signal to output the equalized signal comprises:
generating a third digital signal by feeding the second digital signal to a first equalizer;
generating a fourth digital signal by feeding the first decision signal and the second decision signal to a second equalizer; and
adding the third digital signal and the fourth digital signal to obtain the equalized signal.

10. The method as claimed in claim 9, wherein the coefficients of the second equalizer is initialized based on the coefficients of the synthesis filter.

11. The method as claimed in claim 1, wherein the co-channel interference signal is a NTSC signal and the digital signal is a digital television signal.

12. A receiver capable of rejecting a co-channel interference signal from a first digital signal, the receiver comprising:
an interference rejection unit, receiving the first digital signal and outputting a second digital signal, comprising:
a first delay unit with M taps, delaying the first digital signal and generating a first delayed signal, wherein M is a positive integer;
a synthesis filter, generating a synthesized interference signal based on the first digital signal, wherein the synthesis filter is a N-tap FIR filter with N>M; and
a first subtracting unit, subtracting the synthesized interference signal from the first delayed signal and outputting the second digital signal; and
an equalization unit receiving the second digital signal and a first decision signal, and outputting an equalized signal, comprising:
a first equalizer, receiving the second digital signal and generating a third digital signal;
a second equalizer, receiving the first decision signal and generating a fourth digital signal; and
an adder for adding the third and fourth digital signals and outputting the equalized signal;
a first decision unit, receiving the equalized signal and generating the first decision signal;
a compensation unit, receiving the equalized signal and the first decision signal and generating an output signal, comprising:
a second delay unit with M taps, delaying the equalized signal and generating a second delayed signal;
a compensation filter, generating a compensation signal based on the first decision signal; and
a second subtracting unit, subtracting the compensation signal from the second delayed signal and outputting a fifth digital signal serving as the output signal.

13. The receiver as claimed in claim 12, wherein the synthesis filter is a N-tap symmetric FIR filter with $N=2M+1$.

14. The receiver as claimed in claim 12, wherein the first decision unit is a first slicer.

15. The receiver as claimed in claim 12, further comprising a second decision unit for generating a second decision signal based on the fifth digital signal, wherein the second equalizer receives the first and second decision signals to generate the fourth digital signal.

16. The receiver as claimed in claim 15, wherein the second decision unit is a second slicer.

17. The receiver as claimed in claim 15, wherein the second decision unit is an error correction decoder.

18. The receiver as claimed in claim 12, wherein the coefficients of the second equalizer is initiated according to the coefficients of the synthesis filter.

19. The receiver as claimed in claim 12, wherein the coefficients of the compensation filter is set according to the coefficients of the synthesis filter.

20. The receiver as claimed in claim 12, wherein the co-channel interference signal is a NTSC signal and the digital signal is a digital television signal.

* * * * *